United States Patent [19]

Maxwell

[11] 4,049,122
[45] Sept. 20, 1977

[54] NESTABLE NON-CORROSIVE CONTAINER FOR PRESSURIZED BEVERAGES AND PROCESSES FOR MANUFACTURE AND HANDLING THEREOF

[76] Inventor: Earl G. Maxwell, 9108 Halls Ferry Road, St. Louis, Mo. 63136

[21] Appl. No.: 516,378

[22] Filed: Oct. 21, 1974

[51] Int. Cl.² .................. B65D 21/02; B65D 7/48; B65D 17/24
[52] U.S. Cl. .................. 206/519; 206/520; 220/67; 220/72; 220/73; 220/270; 426/133
[58] Field of Search .................. 206/515–520; 220/73, 74, 270, 67, 71, 66, 72; 426/133; 113/120 R, 120 H, 120 K, 120 V, 120 BB

[56] References Cited

U.S. PATENT DOCUMENTS

| 112,477 | 3/1871 | Merrill | 206/519 |
|---|---|---|---|
| 2,288,602 | 7/1942 | Benton | 206/520 |
| 2,412,178 | 12/1946 | Seigh | 206/519 |
| 2,484,271 | 11/1949 | Coyle | 220/72 |
| 2,605,929 | 8/1952 | Bloomfield | 220/73 |
| 3,135,418 | 6/1964 | Tracy | 206/821 |
| 3,272,383 | 9/1966 | Harvey | 220/66 |
| 3,355,060 | 11/1967 | Reynolds | 220/270 |
| 3,425,382 | 2/1969 | Johnson | 113/120 R |
| 3,559,841 | 2/1971 | Ullman | 220/73 |
| 3,603,476 | 9/1971 | Coppers | 220/67 |
| 3,701,454 | 10/1972 | Thorp | 220/270 |
| 3,850,340 | 11/1974 | Siemonsen | 206/519 |
| 3,910,414 | 10/1975 | McCay | 206/515 |

FOREIGN PATENT DOCUMENTS

| 1,201,792 | 1/1960 | France | 206/519 |
|---|---|---|---|
| 1,191,285 | 4/1965 | Germany | 206/520 |
| 1,005,803 | 9/1965 | United Kingdom | 426/133 |
| 1,248,625 | 10/1971 | United Kingdom | 113/120 V |

*Primary Examiner*—George E. Lowrance
*Attorney, Agent, or Firm*—Richard G. Heywood

[57] ABSTRACT

The invention comprises a returnable, non-corrosive metal container that can be cleaned and sterilized for re-filling with a pressurized beverage, the container having a tapering side wall with an integral bottom wall end and an open top end having a beaded rim to receive and sealably hold a removable closure, and ledge means extending from the side wall in predetermined spaced relation with one of the top and bottom ends for nestably receiving another similar container with the tapering side wall thereof being spaced away from the first container side wall in a non-locking relationship. The invention also comprises the process of manufacturing returnable, tapered and nestable non-corrosive metal containers including forming a basic container configuration from sheet metal by blanking in scroll pattern and making a first draw, making a second draw, making a third draw and tapering the side wall of the container while starting a rim curl, optionally making a further draw and taper or reshape while maintaining the rim curl, trimming the top rim and shaping the start curl, applying seal compound to the rim curl and forming a beaded rim, reshaping and cleaning excess compound, forming ledge means in the tapered container side wall, and final cleaning and stacking and packaging for shipment. The invention further comprises the process of handling tapered, non-corrosive metal containers for reuse including receiving stacked, used, empty containers in nested, non-locking relationship; inspecting pre-cleaned and de-labeled containers and reshaping and buffing damaged containers to a restored and reusable condition, palletizing columns of stacked, nested containers in multiple rows, sequentially transferring separate columns of containers and sequentially separating individual containers for refilling with a pressurized beverage product.

12 Claims, 21 Drawing Figures

NESTABLE NON-CORROSIVE CONTAINER FOR PRESSURIZED BEVERAGES AND PROCESSES FOR MANUFACTURE AND HANDLING THEREOF

BACKGROUND OF THE INVENTION

Throughout the years all types of beverages have been packaged (generally called "bottling" in the trade) in a wide variety of relatively small containers for general distribution and sale to the public. Such beverages include carbonated and non-carbonated liquids and both alcoholic and non-alcoholic drinks, such as beer and ale, soda "pop," fruit juices and other beverages that may be identified or classified by different designations depending upon the respective industries, local customs or colloquial expression, official government regulations or the like. Such relatively small containers (in the range of 6 oz. to 24 oz.) for sale to the general public have included glass bottles of the returnable type for cleaning, relabeling and refilling and glass bottles of the "throw-away" or non-returnable type, and cans formed from tin plate, aluminum or the like that are also non-returnable.

In general, it will be recognized that the different beverage or bottling industries have been motivated in their selection of containers by many factors including corporate image and consumer acceptance, but primarily by the economics of the containers itself. The economic aspects are relatively complex since, in addition to the basic cost of making and shipping empty containers, the brewery or soft drink bottling company or the like must anticipate its production requirements, storage or warehousing capacity, processing costs, life span of the container or average reuse or, in the alternative, the reclaim or recycle value. With particular reference to the brewing and soft drink industries, one of the principal problems of present containers, whether glass or metal cans, is that they require a large volume of space for both storage and handling since it is necessary to have many square feet of storage floor space merely to maintain filling lines with a sufficient number of containers to continue high speed production. In the case of glass containers, they are heavy and subject to breakage and returnable glass bottles present a further problem to retail sales outlets who must sort out different brands also store large volumes of empties until they are picked up for return to the beverage company.

Two of the major aspects of presently available containers involved the problem of preserving natural resources and ecological considerations in the manufacture, processing and reuse of containers. Material shortages (of natural resources) are being realized in all fields and, even though the present invention utilizes a relatively expensive commodity (such as stainless steel or a like non-corrosive metal), it is believed that the extended returnable and reusable life of this product will be beneficial to the national or international economies since it will obviate or substantially reduce the current material shortages as to the availability of tin plate and aluminum. It should also be recognized that the manufacturing process of stainless steel or the like generates no more air pollutants than glass containers, and is substantially less of an air pollutant problem than the manufacture of aluminum, tin plate or tin plate steel (can containers) which will require a coating process for compliance with F.D.A. requirements. Obviously, such a process by itself requires a large energy consumption and generates a substantial amount of heat and air pollution.

These and other ecological problems of beer and soft drink bottles and cans have come to the forefront in recent years, with legislation against littering and, in some states, laws prohibiting the use of either metal or glass throw-away containers. However, in spite of such laws and strong campaigns for recycling both metal and glass containers to obviate the litter problem and, more importantly, to preserve and maximize the use of our natural resources, we are still confronted with an apathetic public that does litter and will not bother to utilize recycling centers. This problem is largely due, not only to the low cost of present containers, but their lack of utility by the consumer public for any purpose other than consumption of the product and disposal of the container.

Accordingly, in the interest of preserving the environment and maximizing the use of natural resources, there is an increased interest in returnable and reusable containers which require a more substantial deposit on such containers for soft drinks and beer; the concept being that the deposit will make the containers too valuable to discard thus solving the major litter problem and forcing the reuse of materials from our natural resources, since even if the containers are discarded scavengers will collect them and cash them in. In fact, where legislation has been enacted requiring the payment of a deposit, it has materially improved the situation. However, conventional cans must go through a whole recycling or re-manufacturing process, while returnable glass bottles can be washed and relabeled before being reused. Returnable glass bottles are inconvenient for consumers, retailers, distributors and the like for many reasons. For example, consumers object to carrying the heavy empty bottles back to the retailer, and some apartment dwellers complain that they do not have space enough to store empties. Furthermore, consumers prefer cans over bottles since they are not subject to accidental breakage like glass and are more quickly chilled. Glass bottles are inconvenient for retailers who also have storage problems and for operators of delivery trucks because they make up more space than cans and weigh a lot more; capacity per truck is reduced because of these size and weight limitations and operation costs are thereby increased. In addition, there are great seasonal use fluctuations so volumes of returnables may vary widely.

A still further aspect of containers, as dispensed in vending machines in gasoline service stations and like operations, is that returnable glass bottles are generally provided for, but again occupy a substantial amount of space. Present metal containers or throw-away cans are generally not recycled, whereas the present invention is adaptable to vending machine operations with a large deposit for dispensing and a return deposit for the container when properly placed in a return chute therefor. In other words, the nestable feature of the present invention will facilitate a few vending machine operation to assure that the container is returned or that an equitable price for the container has been paid by the consumer.

SUMMARY OF THE INVENTION

The present invention comprises a returnable and reusable container formed of non-corrosive metal, such as stainless steel, for packaging beer or ale, soft drinks and like pressurized beverages, the container being tapered and nestable in a non-locking or non-wedging relationship in unfilled condition and being provided with a fully removable sealing lid when filled so that the container can be used as a drinking cup or "glass". The invention also comprises the process of manufacturing such containers, and the process for the handling and packaging of such containers.

The principal object of the present invention is to provide a reusable, new and improved non-corrosive container for holding pressurized beverages such as soft drinks and beer, which is convenient for the consumer, retailer, trucker and the bottler to handle thus encouraging reuse of the containers to preserve natural resources and the environment from litter.

Another object is to provide a method for manufacturing and handling or processing the container in the bottling of pressurized or carbonated beverages, such as soft drinks and beer.

Another object is to provide a container which is easily cleaned by the consumer, for household usage or storage, and easily cleaned and filled by the packer or brewer because of its large opening at the top, thus facilitating efficient, high production line speeds.

Another object is to provide a container which is relatively light (in comparison to glass bottles of similar volume), strong and unbreakable, and which because of its tapered sides permits the nesting of many containers for convenient storage by the consumer, as well as storage by the retailer, distributor, bottler or the like.

Still another object of the invention is to provide a cup-shaped container suitable for container usage for pressurized beverages with an associated, fully-removable cover so that it will also serve as a drinking cup for the original or other contents.

Another object is to provide an elegant stainless steel container, or one made of like non-corrosive metal, acceptable by F.D.A. and other government agencies for packaging of pressuried beverages, and of such value and quality that it will be readily accepted as a "high style" item by consumers and not cast off or arbitrarily disposed of; and which can be re-conditioned and reused many times by the bottling trade due to such characteristics.

Another object is to provide a container that may be utilized by competitors in the same product market or interchangeably in different beverage markets without requiring time and effort by retailers or beverage producers in sorting and complex bookkeeping in accounting for returned containers.

Still another object is to provide a reusable, non-corrosive container that can be dispensed in a vending machine having facilities for return of empty containers with a return deposit therefor.

Yet another object of the present invention is to provide a novel reusable, stainless steel container for pressurized beverages, and which will substantially reduce ecological problems in manufacture, use of natural resources and littering.

These and still other objects and advantages will become more apparent hereinafter.

BRIEF DESCRIPTION OF THE DRAWINGS

In the drawings which illustrate embodiments of the invention and in which like numerals refer to like parts wherever they occur.

DESCRIPTION OF THE PREFERRED EMBODIMENTS

Figures 5, 6, 7, 8:
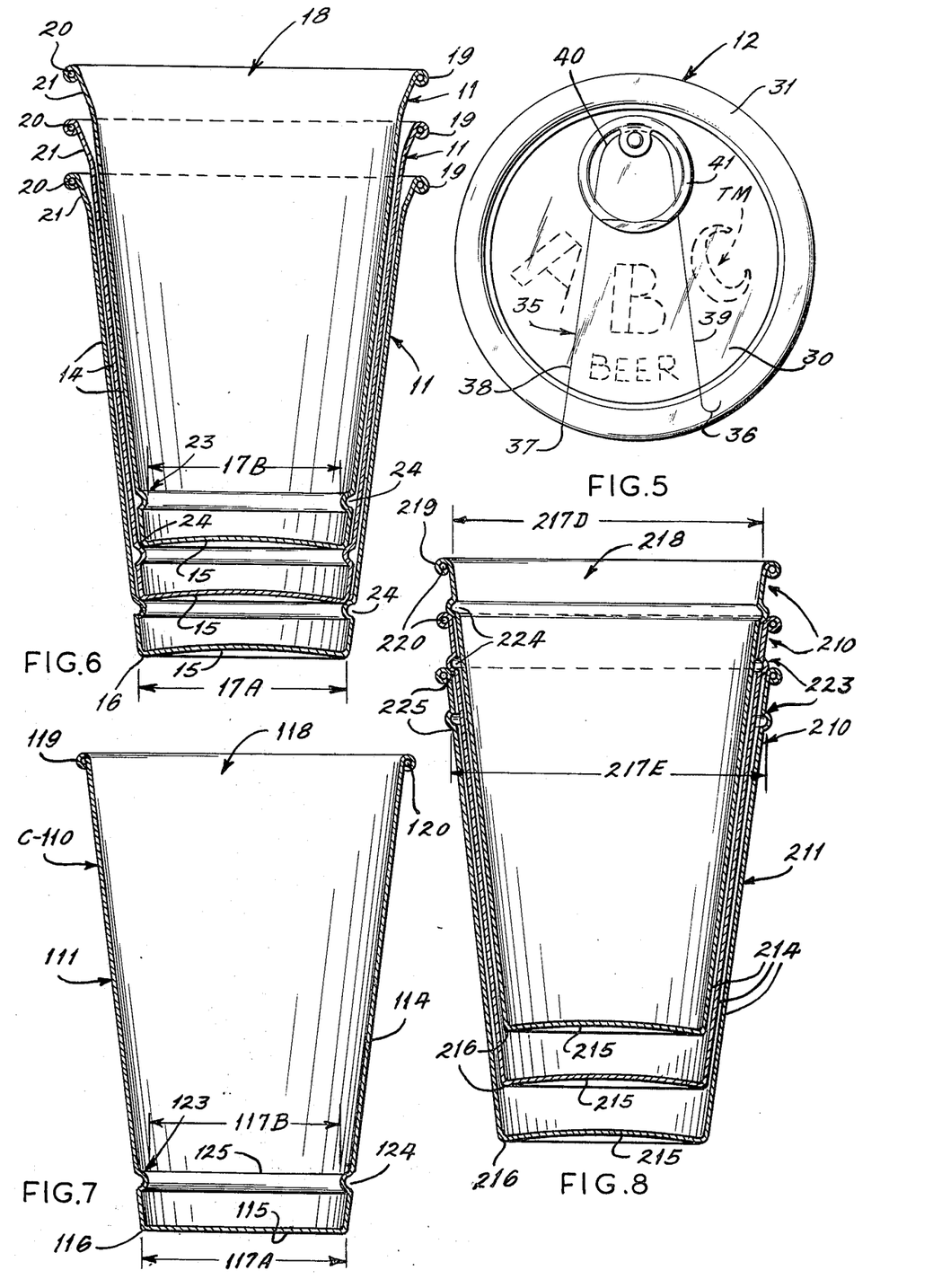
FIG. 5 is a plan view of a typical closure seal plate adapted for use with containers embodying the present invention.
FIG. 6 is a cross-sectional view illustrating the nested and non-interlocking relationship of a plurality of containers according to the preferred embodiment of the present invention.
FIG. 7 is a cross-sectional view of a modified container embodying the present invention.
FIG. 8 is a cross-sectional view illustrating a further embodiment of the container, and showing a plurality of this container embodiment in nested and non-interlocking relationship.

Referring now to the drawings, FIGS. 1-6 illustrate a presently preferred embodiment of a reusable, nestable, non-locking and non-corrosive container C-10 embodying the invention, FIG. 7 illustrates another embodiment of the container C-110, and FIG. 8 shows a still further embodiment of the container C-210. Numerals in the "100" series and "200" series corresponding to features of the preferred container C-10 for a pressurized beverage B will be used for similar features of the FIG. 7 and FIG. 8 embodiments.

Figure 1:
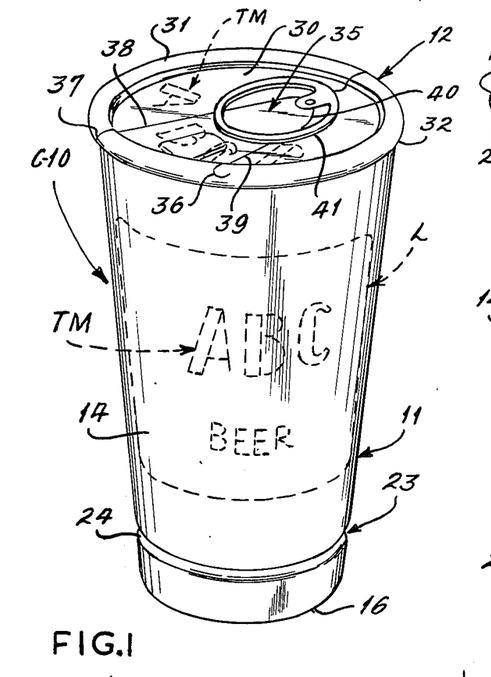
FIG. 1 is a perspective view of a preferred embodiment of a filled and sealed container embodying the present invention.
Figure 2:
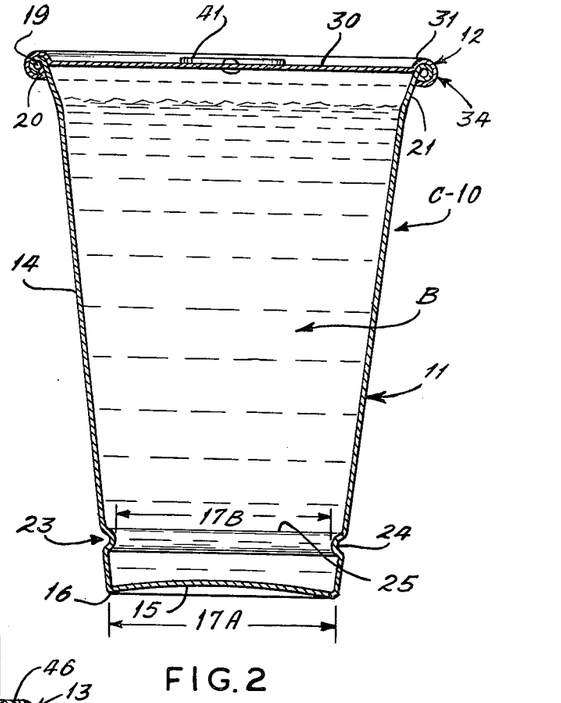
FIG. 2 is a cross-sectional view of the filled and sealed container as illustrated in FIG. 1.
Figures 3, 4:
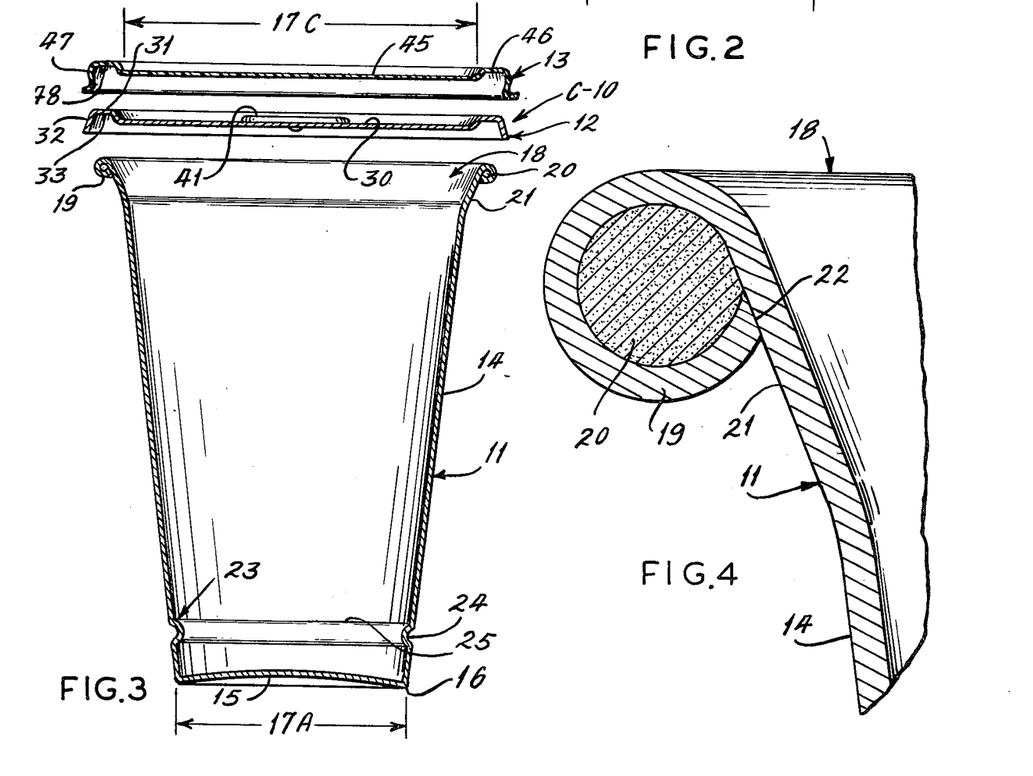
FIG. 3 is an exploded cross-sectional view of the container of FIG. 2 showing the closure seal plate prior to sealing, and also showing an auxiliary plastic closure plate adapted for use with containers embodying the invention.
FIG. 4 is a greatly enlarged fragmentary cross-sectional view illustrating the beaded rim and sealing means therefor.

Referring now to FIGS. 1-6, the container C-10 comprises a main container body 11 having a main closure plate or sealing lid 12 and, in addition as optionally shown in FIG. 3, the sealed container C-10 may be provided with a removable, snap-on, flexible closure or cover 13.

The main container body 11 of the container C-10 has a cup-shaped, tapered, frusto-conical side wall 14 which permits multiple empty containers to be nested or telescopically packed together in order to minimize space for storage and handling, as will become more apparent hereinafter. The main body 11 also has a bottom wall 15 fromed integral with the side wall 14, the bottom wall 15 preferably being formed with an upward concave configuration thereby defining an annular peripheral lower rim or seating surface 16 at the juncture of the side and bottom walls 14 and 15. Accordingly, in actual use as a drinking cup, the container C-10 will sit firmly and not be subjected to any major rocking motion as may occur with a straight circular bottom wall (see bottom wall 115 of FIG. 7) when placed upon an uneven supporting surface (not shown). The diametral dimension or circumference of the annular seating surface 16, as indicated at 17A in FIGS. 2, 3 and 6, comprises an important feature of the invention as will be explained. The main body 11 of he container C-10 also has a relatively large open top 18 defined by an annular, closely turned, outwardly beaded rim 19, the interior cavity of which is filled with a seam compound 20 of an F.D.A. approved anti-bacteriostatic composition adapted to withstand heat, moisture, ultra-violet light and other cleaning and inspection techniques and the like so that the container C-10 can be sterilized for reuse, FIG. 4. The large top opening 18 facilitates thorough cleaning and rapid filling in high speed production lines.

In addition, the main body 11 of the preferred embodiment of the container C-10 (as shown best in FIGS. 2–4 and 6) has an outwardly flaring upper side wall portion 21 extending from the beaded rim 19 to the straight wall section of the tapering, frustro-conical side wall 14 and being formed either in a curvilinear or angular relation from the side wall 14 in order to constitute an esthetically pleasing appearance and functional configuration for use of the container C-10 as a drinking cup. Again referring to FIG. 4, it should be noted that the free edge 22 of the beaded rim 19 may be trimmed or otherwise angularly formed too have a tight fit against the flaring upper side wall 21, thereby minimizing exposure of the sealing compound 20 to reprocessing steps and maintaining the integrity of the container for reuse for many years.

One of the more important features of the container C-10 comprises the formation of a ledge or shoulder 23 projecting from the side wall 14 and adapted to seat the annular bottom rim 16 in such a manner that multiple containers C-10 can be nested or telescoped with the adjacent side walls 14 thereof in a spaced apart, non-locking relationship. As shown best in FIGS. 2, 3 and 6, the ledge or shoulder 23 in the preferred container C-10 is provided in the form of an annular, concave depression 24 formed inwardly in the side wall 14 in predetermined spaced relation with the bottom wall 15 and annular rim 16. The ledge means 23 on the interior of the container C-10 forms a shelf or abutment surface 25 having a diametral dimension or circumference, as indicated at 17B, smaller than the annular bottom rim 16 and diametral dimension 17A thereof. In short, the ledge or shoulder 23 preferably comprises an annular indentation spaced above the bottom wall 15 in a relationship affording a firm seating shoulder or ledge 25 for the bottom rim 16 of another empty container C-10 with a non-wedging contact therebetween and with a maximum nesting or telescoping relationship and yet providing a sufficient spacing from the bottom wall 15 to permit easy cleaning and sterilization of the container C-10. It should also be noted that the annular depression 23 adjacent the bottom of the outer side wall 14 relieves the austerity or plain appearance of the tapering side wall 14 and affords maximum exterior surface area for applying a label L to identify the brand and contents of the container C-10, although it will be readily apparent that the trademark TM and/or other identifying indicia may be lithographed, embossed or stamped directly onto the side wall 11 but in such a manner that it will not project outwardly to a degree that would be sufficient to interfere with the non-locking feature provided by the spacing between nested container side walls 14.

A principal feature of the present invention is that the container C-10 is formed of a high quality non-corrosive metal having the strength to hold pressurized beverages B and withstand damage in normal processing, handling and use; also having a high sheen or luster and good feel for ready consumer acceptance; and being returnable and reusable as a container many times with minimum processing and handling problems, as will be described hereinafter. While the container C-10 of the present invention should not be limited to a specific non-corrosive metal due to the variety of alloys that may meet the objectives and advantages of the invention, the presently preferred metal is stainless steel approximately in the grade range designated in the trade as Type 304 to Type 316 stainless steel which are commercially available at the present time. Both grade 304 and grade 316 are approved by the F.D.A. for good and beverage usage, and grade 304 is presently believed to be the most satisfactory due to its corrosion resistant characteristics and relatively low cost, as compared with grade 316 for instance. The pressure range of most pressurized beverages is generally between about 80 psi to 120 psi and, in using stainless steel for the seamless container C-10, it is recommended that the thickness gauge be in the minimum range of 0.005 to 0.008 inch and a maximum of about 0.015 inch. In the event the tear-off cap 12 is made of aluminum, the thickness gauge should be about 0.010 to 0.011 inch although it will be apparent that these ranges may be varied depending upon the specific beverage B or if different non-corrosive metals are utilized for the container C-10. It may also be found that the more expensive and higher corrosion resistant metals will afford better economies over periods of long range usage, and new grades or other alloys may be specifically developed due to the magnitude of container material that will be required for wide-spread industry usage. In short, one of the important features of the invention is that the side and bottom walls 14 and 15 of the container C-10 define an internal cavity having a permanent non-corrosive metal surface that is chemically inert or non-reactive with the pressurized beverage contents.

Referring particularly to FIGS. 1, 2, 3 and 5, the main sealing lid 12 for the container C-10 comprises a fully removable, tear-off closure seal or cap adapted to maintain the beverage B under pressure in the container C-10. The sealing cap 12 has a circular main body portion 30 with a peripheral annular, upstanding channel portion 31 having an outer free edge flange 32. The lower channel surface 33 of the channel 31 is adapted to be pressed onto the beaded rim 19 of the container C-10 and the edge flange 32 rolled or crimped about the container's beaded rim 19, in a typical manner, as at 34 in FIG. 2. The tear-off cap 12 is fully removable, as stated, and has a non-detachable score line 35 of reduced strength, including an arcuate leading or retaining curve 36 located on the annular channel member 31, a terminal end 37 extending across the channel member 31 through the edge flange 32, and converging connecting score lines 38 and 39 extending from the terminal end 37 and acruate curve 36 angularly across the central portion to a point adjacent the diametrically opposite portion of the annular channel member connected by a curved line 40 defining the location of a gripping tab or ring 41. The tear-off sealing closure 12 is fully separable from the container C-10 (C-110, C-210) along the line of reduced strength extending from the edge flange 32 to the arcuate curved non-detachable end 36 by snapping the closure open, in a normal manner, by pulling the gripping tab 41 to rupture the closure cap 12 at the curved line portion 40 and pulling the tap 41 to sever the cap 12 along the divergent lines 38 and 39 extending from the tab 41. The retaining curve 36 stops this action, but the cap 12 will be finally removed along the terminal edge line 37 extending to the rolled-in edge 34 of the sealing cap 12 under the beaded rim 19 of the container C-10.

It will be noted that the tear-off sealing cap 12 may be lithographed or embossed with the brand TM, and that the position of the gripping tab 41 adjacent to one side of the channel portion 31 provides a maximum area of the circular main body 30 on which to apply such identification.

Although various forms of "metal" tear-off sealing closures have been well known for many years and are still in prevalent usage today, vast improvements have been made in recent years in the use of plastic materials. Accordingly, the invention encompasses the use of a suitable, low-price plastic sealing member 12 that is fully removable and minimizes potential waste of metal materials that may be discarded irrespective of the high reclaim value of the container C-10 itself.

Referring again to FIG. 3, the container C-10 may be provided with the flexible or plastic, snap-on cover 13 comprising a circular main body portion 45, an upstanding or raised annular channel portion 46 and a downwardly extending annular edge flange 47 defining an interior lower channel surface 48. The plastic cover 13 is used to cover a container C-10 filled with a pressurized or carbonated beverage B sealed with the tear-off sealing plate 12, by snapping the interior channel portion 48 down over the channel portion 31 of the main sealing cap 12 with the circular body 45 being spaced above the main body 30 and gripping tap 41 of the cap 12 and the edge flange 47 of the cover 13 engaging the beaded edge flange 34 (FIG. 2) of the cap 12. It should be noted that the diametral or circumferential area 17C of the circular body 45 within the annular portion 46 is larger than the dimension 17A of the annular seating rim 16 of the container C-10 so that, when the cover 13 is removed and the container C-10 is opened by removing the sealing cap 12, the cover 13 may be used as a coaster for the container C-10. The interior channel surface 48 and outer annular edge flange 47 of the cover 13 are also adapted for sealing engagement with the beaded rim 19 of the container C-10 (with the sealing cap 12 removed) so that the container C-10 can be resealed when the beverage B is only partially consumed, or when it may be desired to utilize an empty container C-10 for other products or purposes around the house rather than returning it for normal reuse. It will also be recognized that the snap-on flexible closure 13 may be provided with the trademark TM (not shown) or other advertising or promotional literature.

Referring now to FIG. 7 in which another embodiment or modified container C-110 is illustrated, the container C-110 is similar in most respects to the container C-10 having a main body 111 with a tapering side wall 114 and integral bottom wall 115 connected at an annular rim 116 and having an open top end 118 defined by a rolled beaded rim 119 filled with a sealing compound 120 and being adapted to receive a fully removable, tear-away main sealing cap (not shown) for maintaining beverages in the container C-110 under pressure. In this embodiment, the container side wall 114 is frusto-conical, that is, it has a straight line taper between the bottom wall 115 and the beaded rim 119 without being outwardly flared at its upper end; and the container C-110 also has a straight line circular bottom wall 115 that is not curved upwardly in a concave configuration. However, the important feature of the invention is retained in the form of an inward annular ledge or shoulder 123 spaced predeterminedly from, but adjacent to the bottom wall 115 and forming an interior abutment or shoulder 125 for seating the bottom rim 116 of a similar container C-110 in a nested relationship with the side walls 115 thereof being spaced and non-locking. In short, the diametral dimension 117B of the annular interior shoulder 124 is smaller than the diametral dimension 117A of the bottom wall 115, as previously described.

Referring now to FIG. 8 wherein another embodiment of the container C-210 is illustrated, this container C-210 also has similarities to both containers C-10 and C-110 previously described. The container C-210 has a main body 211 with a straight line tapering, frusto-conical side wall 214 (as in the C-110 embodiment) formed integral at its lower end with an upwardly concave bottom wall 215 defining an annular or peripheral seating rim 216 at the juncture thereof (as in the C-10 embodiment). The upper end of the side wall 214 is provided with the rolled beaded rim 219 filled with sealing compound 220 and defining the open top 218 of the container C-210 and being adapted to receive a fully removable, tear-away sealing closure (not shown, but previously described as sealing cap 12 with respect to container C-10) for maintaining beverages under pressure in the container C-210. One of the important (non-locking) features of the present container invention is retained in the form of an annular ledge or shoulder means 223 forming an abutment or shoulder 225 for seating contact by a similar container C-210 to position the containers C-210 in a nested or telescoped relationship with the side walls 215 thereof being spaced apart and non-locking, as stated. However, in the FIG. 8 embodiment the ledge or shoulder 223 is in the form of an annular convex bead or rim 224 projecting outwardly from the side wall 214 is predetermined spaced relation with the open top end 218 and annular beaded rim 219 thereof. It will be apparent that the beaded rim 219 has a predetermined diametral or circumferential dimension, identified as 217D, that is smaller than the diametral or circumferential dimension, as indicated at 217E, of the shoulder 225 of the ledge means 223 to afford a firm seating relationship or non-wedging contact between nested containers C-210 while maintaining a non-locking side wall condition. In the modified embodiment of the container C-210 it will be recognized that the rolled beaded rim 219 provides the multiple function of forming a solid, rolled rim for firmly receiving the closure cap 12 to hold pressurized beverages B, strengthening the container C-210 (as in the case of the other containers C-10 and C-110), and also cooperating with the ledge or shoulder 225 to keep nested containers C-210 in a non-locking relationship.

It should be noted that the annular outwardly projecting ledge means 223 of the container C-210 and the annular inwardly projecting ledge means 23 of the container C-10 (also container C-110) are each positioned a predetermined distance from one of the ends of the containers and form an abutment shoulder 22S and 25, respectively, of greater diametral distance than that of the engaging end portion 219 and 16, respectively, to provide the non-locking feature of the invention. Furthermore, each container embodiment C-10, C-110 and C-210 is easily cleaned and sterilized and affords maximum exterior surface area for labeling or the like.

From the foregoing description of the containers C-10, C-110 and C-210, it will be readily apparent that a principal aspect of the present invention is embodied in a nestable, non-locking container formed of non-corrosive metal, such as stainless steel, adapted for pressurized beverages B and having such high metal reclaim value, style and other consumer acceptance for houshold usage as a container and a drinking cup that consumers are unlikely to throw away or otherwise dispose of such containers, thereby affording great savings in storage space, shipment and handling for repeated reuse so that littering and other ecological problems and conservation of natural resources will be vastly improved over present containerization of pressurized beverages. Moreover, the open top ends of the containers are provided with means 19, 119, 219 or the like to releasably receive and sealably retain a closure 12, 112, 212 thereon against pressure in the container and also in such a manner to enable complete removal of the closure without deforming the top end, whereby the containers may be returned and reused with only cleaning and sterilization required.

Manufacturing Process

As previously indicated, tapered non-locking containers C-10 (C-110, C-210) formed of non-corrosive metal embodying the invention are manufactured according to a unique process that will enable such containers to be return for refilling and reuse over an extended period of time with a minimum of handling and storage cost while maintaining the integrity of the container for sterilization against bacteriostatic conditions that would normally be expected in other types of rolled-rim containers. In other words, all prior beaded metallic containers having a "rolled rim" are only recyclable through a completely new recycling and reclining operation.

Figure 9:
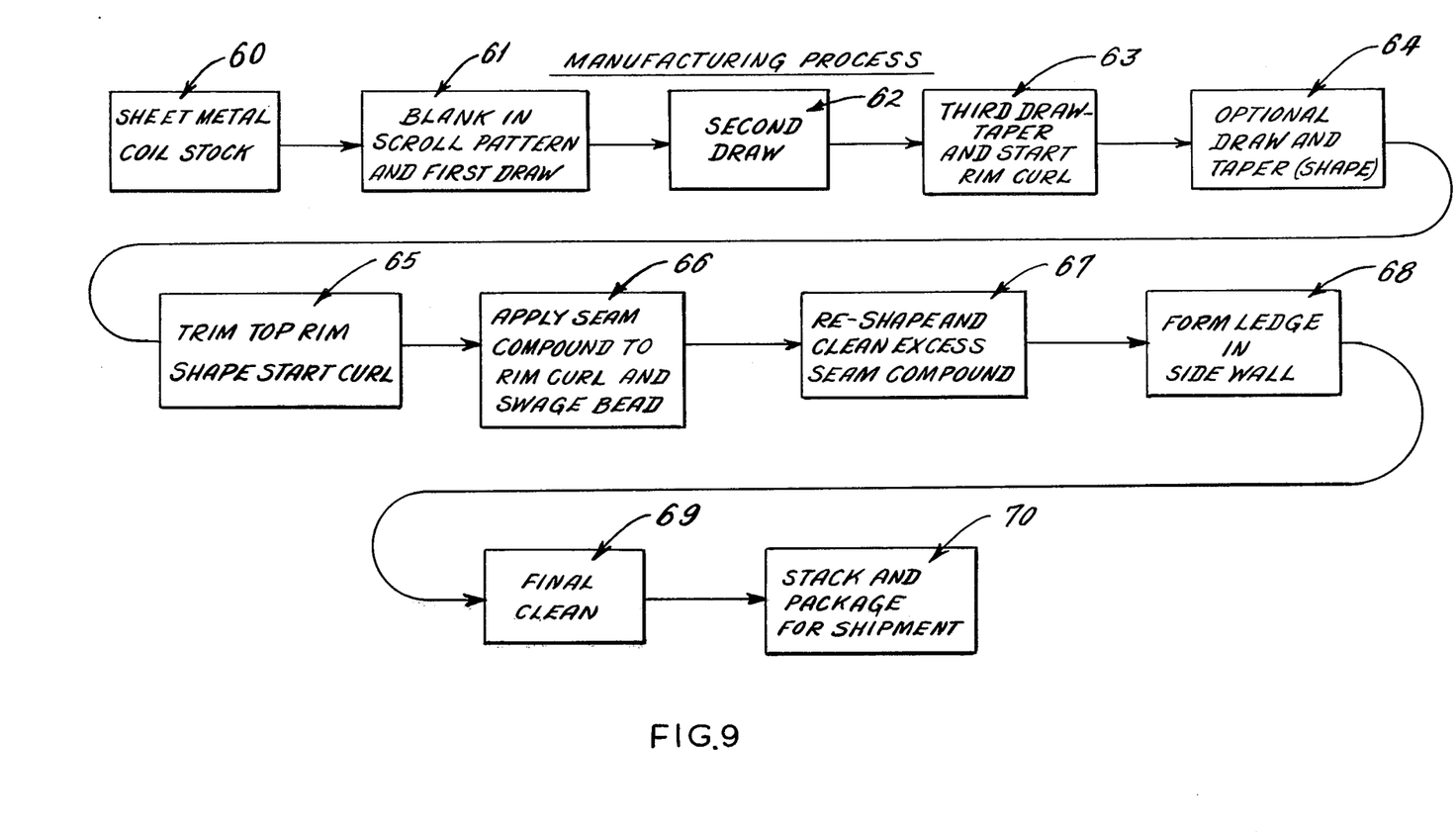
FIG. 9 is a diagrammatic flow chart of the manufacturing process for containers according to the present invention.
Figures 10, 11, 12, 13:
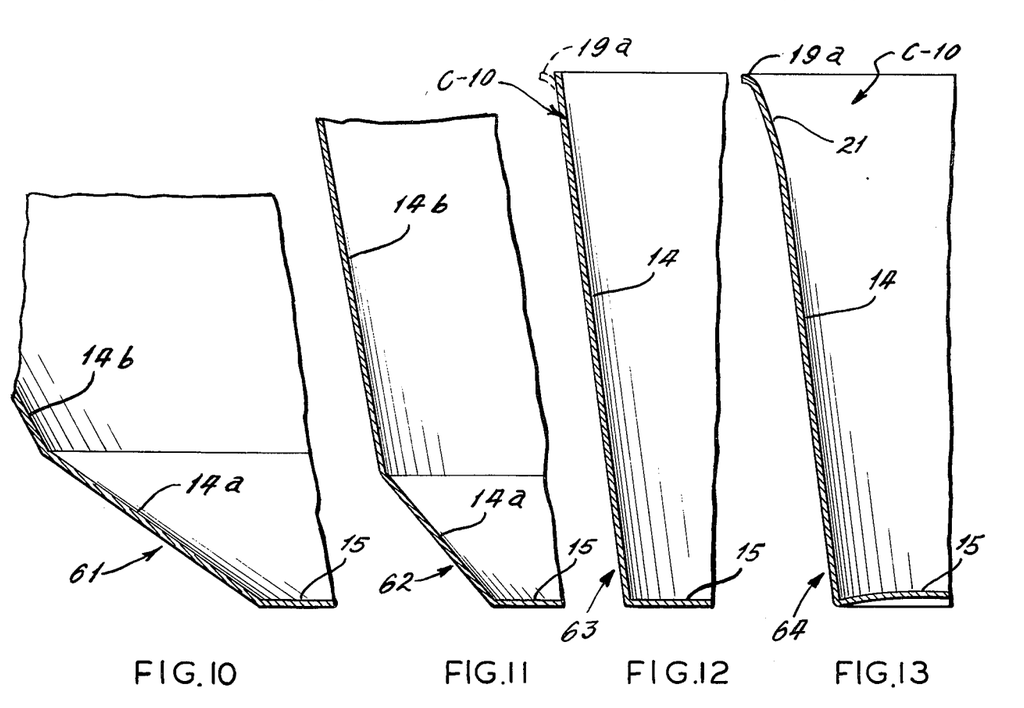
FIGS. 10-17 are fragmentary cross-sectional views illustrating sequential steps in the manufacturing process according to the FIG. 9 diagrammatic flow chart.

Referring to FIG. 9 diagrammatically disclosing the manufacturing process for the container C-10 (C-110 or C-210) and to FIGS. 10-17 illustrating the container configuration in its respective, sequential manufacturing steps in fragmentary cross-section, the manufacturing process of the present invention comprises using sheet metal coil stock 60 and blanking a basic cup-shaped container in scroll pattern as in a conventional punch-press operation and making a first draw 61, FIG. 10. This step involves drawing the sheet metal blank 60 into a basic cup-shaped configuration of uniform thickness having a full-sized bottom wall 15 and relatively widely angled short side wall sections 14a and 14b. A conventional second step in the formation of cup-shaped containers C-10, as illustrated in FIG. 11, is a second draw 62 in which the side wall sections 14a and 14b are re-formed into a more vertical relationship. Referring to FIG. 12, the third step of the present manufacturing process utilizes a third draw 63 in which the container bottom wall 15 and side wall 14 are essentially formed into their respective final relationship and the container C-10 (C-110, C-210) is tapered into its basic frusto-conical configuration.

FIG. 13 illustrates an optional draw and tapering step 64 to provide the outward top flare 21 of the preferred container C-10, and the start rim curl 19a for the final beaded rim 19 may be incorporated into the FIG. 12 step 63 or the FIG. 13 optional step 64. It will also be noted that the concavity of the bottom wall 15 may also be effected in the FIG. 13 optional step.

Figure 14:
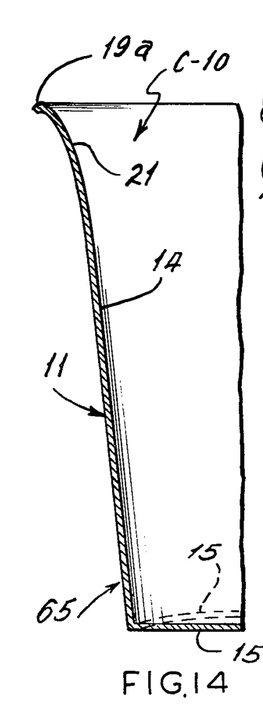

Referring to FIG. 14, the basic container C-10 is now in essentially final configuration for completion, and this step 65 involves trimming the start curl 19a of the top rim 19 so that it is cut in a plane essentially perpendicular with the base wall 15 or angularly to effect the closer fit in the flared upper side wall 21, as previously described. The rim start curl 19a is also shaped, and the concavity of the bottom wall 15 may be introduced at this operational stage.

Figure 15:
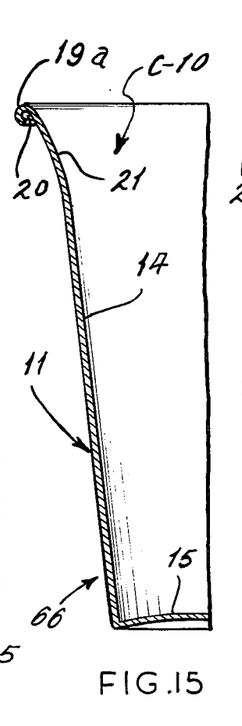
Figure 16:
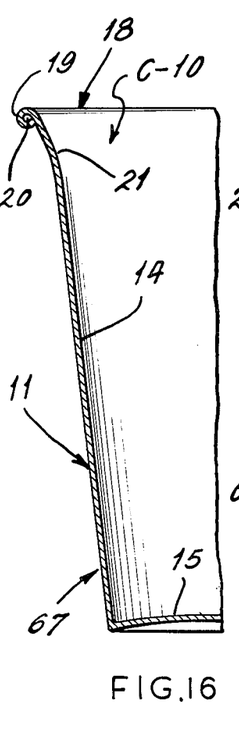

In FIGS. 15 and 16 the anti-bacterial seam compound 20 is applied and actually overflowed onto the exterior surface of the start curl 19a to assure the absence of any voids when the start curl is swaged or rolled into a final beaded rim 19, as at step 66 in FIG. 9. In short, it will be understood that the invention contemplates application of the seam compound 20 to the start curl after the final draw and tapering steps (FIGS. 12 and/or 13) and following the trimming of the top rim, the start curl 19a is formed into a beaded rim 19 (preferably by a straight press or rolling operation) and the container C-10 is re-shaped and excess seam compound cleaned away, as at step 67 in FIG. 9.

Figure 17:
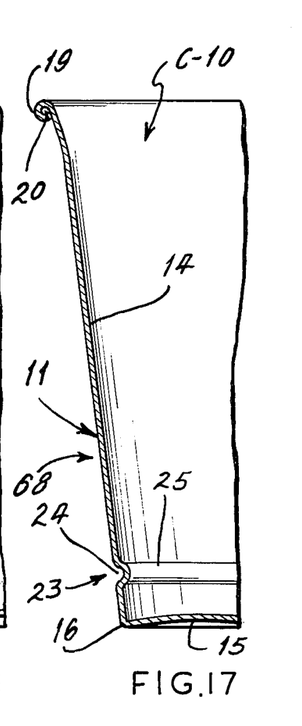

One of the final steps 68, FIG. 9, in the manufacturing process for making containers C-10 (C-110, C-210) is the formation of the ledge means 23 (123, 223) in the side wall 14 of the container main body 11, as shown in FIG. 17. The indented annular depression 24 is best formed by a rolling operation on a mandrel (not shown) and, as previously noted, the spacing of this annular groove 24 from the bottom wall seat 16 is in predetermined relation to the depth of the groove 24 and gauge of the metal so that the inner shoulder 25 of this annular ledge or bead means 23 has a dimension that will firmly seat the bottom end rim 16 of another container in the non-locking condition as discussed.

It should be noted that some steps have been indicated as optional and that some may be reversed or additional steps added to achieve a high quality container product C-10. While stainless steel and like non-corrosive metals lend themselves best to a drawing process due to high production speeds (the manufacturing process herein disclosed and claimed), the container C-10 may also be made by spinning as will be recognized by those skilled in the art. It should again be noted that stainless steel has a high reclaim value so that all trimmed material can be salvaged and re-processed back into sheet metal coil stock 60.

Upon completion of the manufacture of containers C-10, they will go through a cleaning and buffing or polishing step 69; and then be stacked and palletized for storage or shipment to the beverage producer, as at step 70.

Process for Handling and Packaging

As previously discussed, tapered containers C-10, C-110 and C-210 returned to a supermarket or like store for deposit or exchange are nestable in a non-locking relationship and are easily stacked in such non-locking relationship in a manner that relatively little floor space is required. It will also be readily apparent that, irrespective of the volume of sales of beverages in containers embodying the present invention, a delivery truck can collect large numbers of returned and stacked containers C-10, etc. relative to the number of filled containers delivered to the store.

Figure 18:
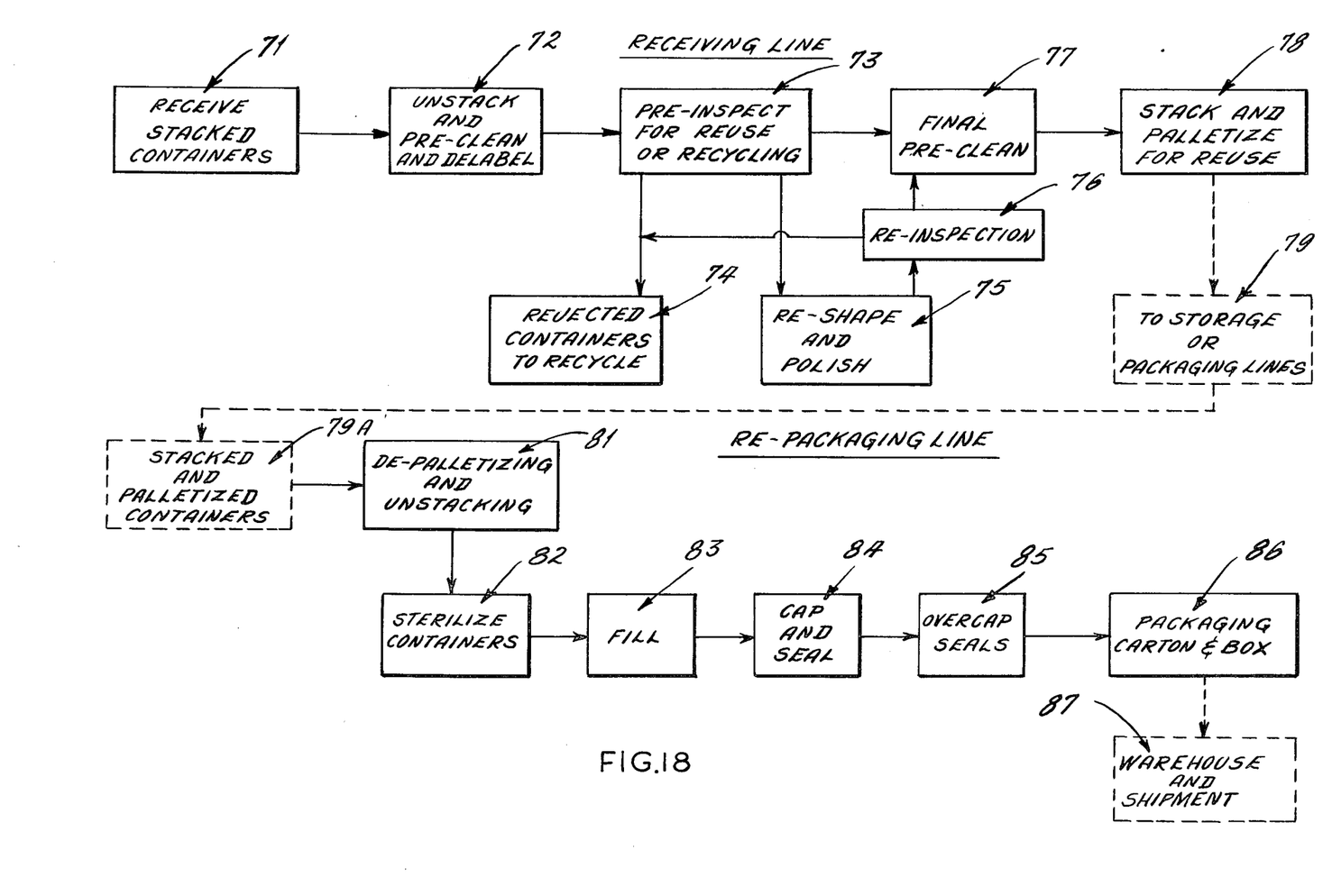
FIG. 18 is a diagrammatic flow chart of the receiving line process for handling or re-processing containers according to the present invention.

Referring to FIG. 18 diagrammatically disclosing a receiving line and process for handling containers C-10 returned to the beverage processing plant for reuse, the stacked containers are delivered at a receiving station 71 at the brewery or bottling company, and then unstacked and pre-cleaned at station 72 in order to remove any foreign materials therein and to de-label the containers for subsequent reuse. It may be noted that, in the absence of any side-wall embossing or other permanent brand and contents identification on the individual containers C-10, the containers are interchangeable between different beverage companies and can be stacked, returned and de-labeled for subsequent processing irrespective of the prior beverage source. At station 73 the containers go through a pre-inspection to determine their condition for reuse and from this station 73 the containers, if badly damaged — usually after many times of reuse, are rejected to a recycling station 74 and it should again be noted that the scrap value of stainless steel or the like is extremely high. However, it is believed that the reuse trips of the present container will greatly exceed returnable glass bottles (a maximum average of approximately 16 reuse trips for glass). If the containers C-10 are only slightly damaged, they are sent to a refinishing station 75 in which minor nicks, scratches or the like can be abraded off or the container is re-shaped, and these containers are then buffed and polished and forwarded through a re-inspection station 76 and, together with good containers ready for reuse from the pre-inspection station 73, to a final pre-clean station 77 in preparation for reuse by the beverage processor. From this pre-clean station 77 the containers C-10 are stacked and pelletized for reuse, as at station 78, by the beverage company and these palletized containers can then be transferred to a storage department or forwarded into the regular packaging lines for immediate reuse, as indicated at 79.

Still referring to FIG. 18, which also discloses a packaging or re-packaging line for filling and sealing containers C-10 with a pressurized beverage B upon demand for additional containers C-10 (C-110, C-210), the stacked and palletized containers 79A are removed from storage 79 or from the previous palletizing station 78 of the receiving line and transferred to a de-palletizing and unstacking station 81 to be described more fully hereinafter. When unstacked and transferred from the de-palletizing station 81, the containers C-10 are individually moved through a final sterilization station 82 in which individual containers are cleaned and dried, and then transferred directly into the beverage handling process including a fill station 83 in which a predetermined quantity of the carbonated or like beverage B is injected into each sequential container C-10 and these containers are then capped and sealed with the closure plate or sealing lid 12 at station 84, and subsequently with the plastic closure 13, if desired, at a subsequent station 85. The filled and capped containers are then transferred to a packaging station 86 in which the containers are placed in cartons, boxes or the like and transferred to suitable warehouse facilitates as indicated at station 87, for subsequent shipment or redistribution to the wholesaler or retailer, such as a supermarket.

Figures 19, 20:
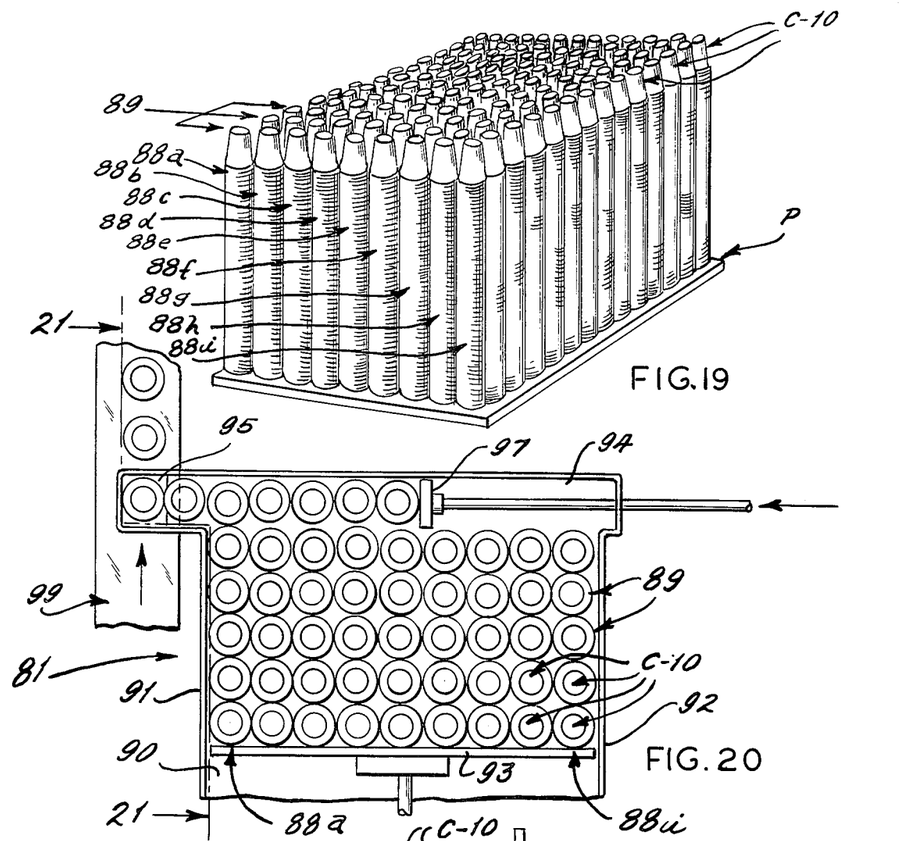
FIG. 19 is a perspective view of palletized empty containers prepared for the repackaging line process.
FIG. 20 is a top view illustrating a portion of the de-palletizing operation of the present invention.

With reference to FIG. 19, the containers C-10 or the like according to the present invention are stacked in nested or telescoped, non-locking relationship on pallets P, as at station 78 in FIG. 18. It will be apparent that the palletization of containers C-10 comprises a series of columns 88a–88i, each having multiple rows of nested or telescoped stacks of containers C-10, as identified generally by 89, utilizing a major savings in space and handling efficiency. For instance, by comparison with present throw-away metal cans, which may be palletized in rank and file of 9 high stacks of cans with 18 columns and 20 rows for an aggregate number of 3,240 cans per pallet, containers C-10 according to the present invention for the same-sized pallet P may accommodate 28,800 containers. In short, it is manifest that a filling line capable of handling 1,200 containers per minute would require only a fraction of the number of pallets and handling operations of conventional throw-away cans for a single day's operations, and it may be noted that a typical glass bottle filling line handles about 600 bottles per minute.

Figure 21:
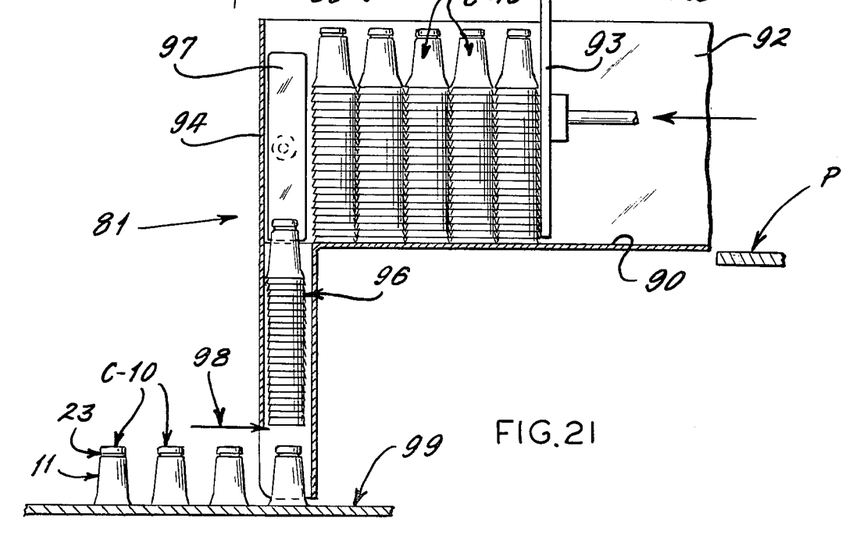
FIG. 21 is a cross-sectional view taken substantially along line 21—21 of FIG. 20 illustrating the de-palletizing operation.

FIGS. 20 and 21 diagrammtically illustrate a filling line operation incorporating the packaging process of the present invention. A pallet P containing the columns 88a–i and rows 89 of stacked containers C-10 is located at the de-palletizing station 81, FIGS. 18, 20 and 21, in a position for transferring these containers in a timed sequential operation to the final sterilization station 82 for subsequent filling and capping, FIG. 18. As shown in FIG. 21, the pallet P may be oriented adjacent to the de-palletizing station 81 having a bottom wall 90 contiguous with the upper surface of the pallet P and adapted to receive the columns and rows of palletized containers C-10 within opposed walls 91 and 92. The station 81 has a discharge column pusher plate 93 for sequentially moving the container columns 88a–i to advance an entire row 89 of the stacks of containers C-10 to an end wall 94 defining one side of an elongated, horizontal discharge passage 95 leading to a vertical passage or chute 96. A discharge row pusher plate 97 is arranged adjacent to the end plate 94 for actuating the container row 89 aligned with the horizontal discharge passage 95 so that the entire row of stacked containers C-10 is moved transversely relative to the direction of actuation of the columns 88a–i by the pusher 93. The row pusher 97 advances the front or leading stack of containers C-10 to drop vertically into the vertical delivery chute 96 into engagement with an unstacking control mechanism, shown generally by an arrow 98 in FIG. 21, for individually separating the containers onto a suitable conveyor 99 leading to the sterilization station 82, FIG. 18.

The row pusher 97 operates intermittently to advance the row 89 of stacked containers upon demand by a sensing control (not shown) in the vertical chute 96 to maintain a continuous supply of containers C-10 for delivery to the conveyor 99 and subsequent processing stations 82, 83, etc. When the last stack of containers from the operative row 89 is dropped into the vertical chute 96, the row pusher 97 will be fully retracted to the side wall 92 and the column pusher 93 is then actuated to advance the next sequential row 89 to the end wall 94 for intermittent transverse actuation by the row pusher mechanism 97, as described.

It will be readily apparent from the foregoing that various automatic equipment (not shown) may be employed to carry out the process disclosed, and the present invention encompasses various structures therefor and is not to be limited to any specific arrangement except by the scope of the claims herein.

What is claimed is:

1. A returnable and refillable metal container for pressurized beverages or the like, comprising a one-piece seamless container body having a frusto-conical side wall and an integral bottom end wall forming an interior cavity to be filled with pressurized beverage, said container body also having an open top end with means adapted to receive and sealably hold a rupturable closure seal thereon against pressures exerted by the beverage within the container, means projecting radially from said side wall between the top and bottom ends and forming an abutment ledge in predetermined spaced relation with one of said top and bottom ends, said container body being adapted to nestably receive a similar container body in any relative circumferential position thereof in non-wedging contact with said abutment ledge means to maintain the side and bottom end walls of the first and similar nested containers in a spaced-apart and non-locking condition for subsequent unrestricted separation for use, said interior cavity being defined by a permanently non-corrosive metal surface which, upon sterilization, is chemically inert to the pressurized beverage, said container body being of predetermined strength and rigidity, and said container being adapted to be used and repeatedly returned for immediate reuse in substantially the original manufactured condition of the container after sterilization of the container.

2. The container according to claim 1, in which said abutment ledge means is formed in said side wall and projects radially inwardly therefrom adjacent to said bottom end wall and in predetermined spaced relation therewith.

3. The container according to claim 2, in which said abutment ledge means comprises a continuous annular protrusion extending inwardly into said interior cavity from the interior surface of said frusto-conical side wall, said annular protrusion having a diametral dimension smaller than the external dimension of said bottom end wall.

4. The container according to claim 3, in which said bottom end wall is concave and defines a rounded annular exterior seating surface at its juncture with said side wall for non-wedging contact upon the inwardly extending abutment ledge means of another similar container.

5. The container according to claim 1, in which said means on the open top end of the container body side wall comprises an annular, closely turned, outwardly and downwardly beaded rim.

6. The container according to claim 5, in which said abutment ledge means is formed in said side wall and projects radially outwardly therefrom adjacent to said open top end and in predetermined spaced relation therewith.

7. The container according to claim 5, in which said abutment ledge means comprises a continuous annular convex protrusion extending outwardly from the exterior of said side wall and having a diametral dimension greater than that of the open top end and being adapted to seat the beaded rim of another similar container.

8. The container according to claim 5, including closure means sealably engaged with said beaded rim for maintaining beverage under pressure within said container, said closure means comprising a closure plate having a fracture line of reduced strength having a terminal end and a non-detachable end, and means for rupturing said closure means along said fracture line to fully remove said closure plate from said container without damaging the open top end and beaded rim thereof.

9. The container according to claim 5, in which said side wall has an outwardly flaring portion extending to said beaded rim at said open top end.

10. the container according to claim 1, in which said non-corrosive metal comprises stainless steel of the grade range designated as Type 304 to Type 316.

11. The container according to claim 10, in which said stainless steel has a minimum thickness gauge in the range of about 0.005 to 0.008 inches and a maximum thickness gauge of about 0.015.

12. A returnable and repeatedly refillable metal container for pressurized beverages or like food products packaged under pressure for distribution and consumption, comprising a seamless container body formed from a one-piece blank and having a tapered side wall and an integral bottom end wall forming an interior cavity to be filled with pressurized beverage, said container body also having an open top end with an annular outwardly and downwardly closely-turned beaded rim adapted to releasably receive and sealably hold a fully removable closure seal thereon against pressures exerted by the beverage within the container, an annular abutment ledge projecting radially from said side wall between the top and bottom ends and in predetermined spaced relation with one of said top and bottom ends, said container body being adapted to nestably receive a similar container body in any relative circumferential position thereof in non-wedging contact upon said abutment ledge to maintain the side and bottom ends walls of the nested containers in spaced-apart and non-locking condition for storage in an empty condition and for subsequent unrestricted separation for use, said metal container being comprised of a permanently non-corrosive metal which, upon sterilization, is chemically inert to the pressurized beverage, said container being of predetermined strength and rigidity, and said container being adapted to be used and repeatedly returned for immediate reuse in substantially the original manufactured condition of the container after sterilization thereof.

* * * * *